United States Patent
Batterywala (10) Patent No.: US 7,827,192 B2
(45) Date of Patent: Nov. 2, 2010

(54) METHOD AND SYSTEM FOR CACHING METADATA OF A STORAGE SYSTEM

(75) Inventor: Yusuf Batterywala, Bangalore (IN)

(73) Assignee: Network Appliance, Inc., Sunnyvale, CA (US)

( * ) Notice: Subject to any disclaimer, the term of this patent is extended or adjusted under 35 U.S.C. 154(b) by 461 days.

(21) Appl. No.: 11/647,961

(22) Filed: Dec. 29, 2006

(65) Prior Publication Data

US 2008/0162817 A1 Jul. 3, 2008

(51) Int. Cl.
*G06F 7/00* (2006.01)
*G06F 17/30* (2006.01)

(52) U.S. Cl. .................. 707/781; 707/822; 707/703; 707/704; 709/217; 709/223

(58) Field of Classification Search .................. 707/100, 707/200, 10, 101, 102, 1, 2, 781, 822, 703, 707/704; 711/106, 165; 709/200, 219, 217, 709/229, 223
See application file for complete search history.

(56) References Cited

U.S. PATENT DOCUMENTS

| | | | | |
|---|---|---|---|---|
| 6,311,213 B2* | 10/2001 | Dawson et al. | .............. | 709/217 |
| 6,339,793 B1* | 1/2002 | Bostian et al. | .............. | 709/229 |
| 7,143,393 B1* | 11/2006 | Ezra et al. | .................... | 717/127 |
| 7,174,417 B2* | 2/2007 | Kim et al. | .................... | 711/106 |
| 2001/0013059 A1* | 8/2001 | Dawson et al. | .............. | 709/217 |
| 2002/0083120 A1* | 6/2002 | Soltis | .......................... | 709/200 |
| 2002/0161855 A1* | 10/2002 | Manczak et al. | ............. | 709/219 |
| 2003/0191745 A1* | 10/2003 | Jiang et al. | ...................... | 707/2 |
| 2004/0111422 A1* | 6/2004 | Devarakonda et al. | ...... | 707/100 |
| 2004/0148479 A1* | 7/2004 | Patel et al. | .................... | 711/163 |
| 2004/0236913 A1* | 11/2004 | Kim et al. | .................... | 711/141 |
| 2005/0071593 A1* | 3/2005 | Vincent | ...................... | 711/165 |
| 2005/0138357 A1* | 6/2005 | Swenson et al. | ............. | 713/155 |
| 2005/0235019 A1* | 10/2005 | Yang | .......................... | 707/204 |
| 2005/0251500 A1* | 11/2005 | Vahalia et al. | ................. | 707/1 |
| 2006/0136472 A1* | 6/2006 | Jujjuri et al. | ................. | 707/102 |

* cited by examiner

*Primary Examiner*—Jean B. Fleurantin
*Assistant Examiner*—Giovanna Colan
(74) *Attorney, Agent, or Firm*—Blakely, Sokoloff, Taylor & Zafman LLP (57) ABSTRACT

A management server maintains a set of metadata describing a storage structure of a storage server. In response to a change of the storage structure, the management server automatically updates the set of metadata. The management server also manages information indicating what portion of the set of metadata is cached locally at a storage management client application. If that portion of the set of metadata is updated in response to the change of the storage structure, the management server sends information to update the metadata cached locally at the storage management client application so that the cached metadata is consistent with the set of metadata at the management server. By caching data at the storage management client application and at the network storage management server, the present invention advantageously avoids sending unnecessary requests to the storage server, thereby reducing network latency.

29 Claims, 10 Drawing Sheets

Metadata data structure 205

| Storage Object ID 301 | Storage Object Name 302 | Free Space Available 303 | Parent Object ID 304 |
|---|---|---|---|
| 1 | Server_Engineer_1 | 10GB | None |
| 2 | Volume_User | 500MB | 1 |
| 3 | Volume_Data | 330MB | 1 |
| ... | | | |
| 30 | Snapshot_5/5/05 | 0 | 2 |
| ... | | | |
| 36 | LUN_Oracle | 300MB | 3 |
| ... | | | |

FIG. 3

Lock Map 206

| Storage Object ID 401 | Exclusive lock 402 | Shared lock 403 |
|---|---|---|
| 1 | 0 | 1 |
| 2 | 1 | 0 |
| 3 | 0 | 1 |
| ... | | |

METHOD AND SYSTEM FOR CACHING METADATA OF A STORAGE SYSTEM

FIELD OF THE INVENTION

At least one embodiment of the present invention pertains to storage systems, and more particularly, to managing storage systems.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In file servers, data is commonly stored in logical containers called volumes, which may be identical with, or subsets of, aggregates. An "aggregate" is a logical container for a pool of storage, combining one or more physical mass storage devices (e.g., disks) or parts thereof into a single logical storage object, which contains or provides storage for one or more other logical storage objects at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files, that is not always the case. That is, a volume or file system may store data in the form of other units, such as blocks or LUNs.

A storage server has the capability to create a persistent, point-in-time image (PPI) of a dataset, such as a volume or a LUN, including its metadata. This capability allows the exact state of the dataset to be restored from the PPI in the event of, for example, data corruption or accidental data deletion. The ability to restore data from a PPI provides administrators with a mechanism to revert the state of their data to a known previous point in time as captured by the PPI. An example of an implementation of a PPI is a Snapshot™ generated by SnapDrive™ or SnapManager® for Microsoft® Exchange software, both made by Network Appliance, Inc. of Sunnyvale, Calif.

A storage server may be managed by a network storage administrator (also called "administrative users" or simply "administrators") by using a storage management console on a network, which may be a computer system that runs storage management software application specifically designed to manage a distributed storage infrastructure. Through the storage management console, the administrator may submit storage management commands to be performed by the storage server, such as creating a volume. A storage management command needs to be checked against the metadata of the storage server to determine whether the command may be performed by the storage server. A command cannot be performed if it violates data and/or structural integrity of the storage server's storage system.

Metadata of a storage server describes a storage structure of the storage server's storage system(s). Particularly, metadata of a storage server includes data identifying logical storage objects of the storage server and relationships among these logical storage objects. A logical storage object (hereinafter "storage object") is a logical storage unit of a storage server (e.g., a volume, a LUN, a PPI). An example of relationship between two storage objects is a parent-child relationship in which one storage object contains the other storage object (e.g., directory and file, or volume and directory, etc.)

In existing implementations, a storage management application usually sends a storage management command to the storage server. If the command violates the storage server's data and/or structural integrity, the storage server sends an error message to the storage management software application. This, in turn, introduces both unnecessary network latency and unnecessary network traffic.

SUMMARY OF THE INVENTION

The present invention includes a method and system for caching metadata of a storage system. The method includes maintaining a set of metadata describing a storage structure of a storage server at a network storage management server. The method further includes automatically updating the set of metadata at the network storage management server in response to a change of the storage structure and the step of sending from the network storage management server at least a portion of the set of metadata to a storage management client application to update metadata cached locally at the storage management client application. By caching data at the storage management client application and at the network storage management server, the present invention advantageously avoids sending unnecessary requests to the storage server, thereby reducing network latency.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for caching metadata of a storage system are described. According to the technique introduced here, a portion of a set of metadata describing a storage structure of a storage system is cached locally at a storage management client application at each client system. In response to a command initiated by a user or a process, the storage management client application determines, based on the locally cached metadata, whether the command violates data and/or structural integrity of the storage system. If there is a violation, the storage management client application does not send the command to the storage system, but returns an error message to the initiated command. A copy of the set of metadata is maintained at a Network Storage Management Server (NSMS). In response to a change of the storage structure of the storage system, the NSMS updates the copy of the set of metadata. In addition, the NSMS determines the storage management client application(s) whose locally cached metadata needs to be updated. The NSMS sends relevant portion of the set of metadata to each of the identified storage management client application to update the metadata cached locally at the client system.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
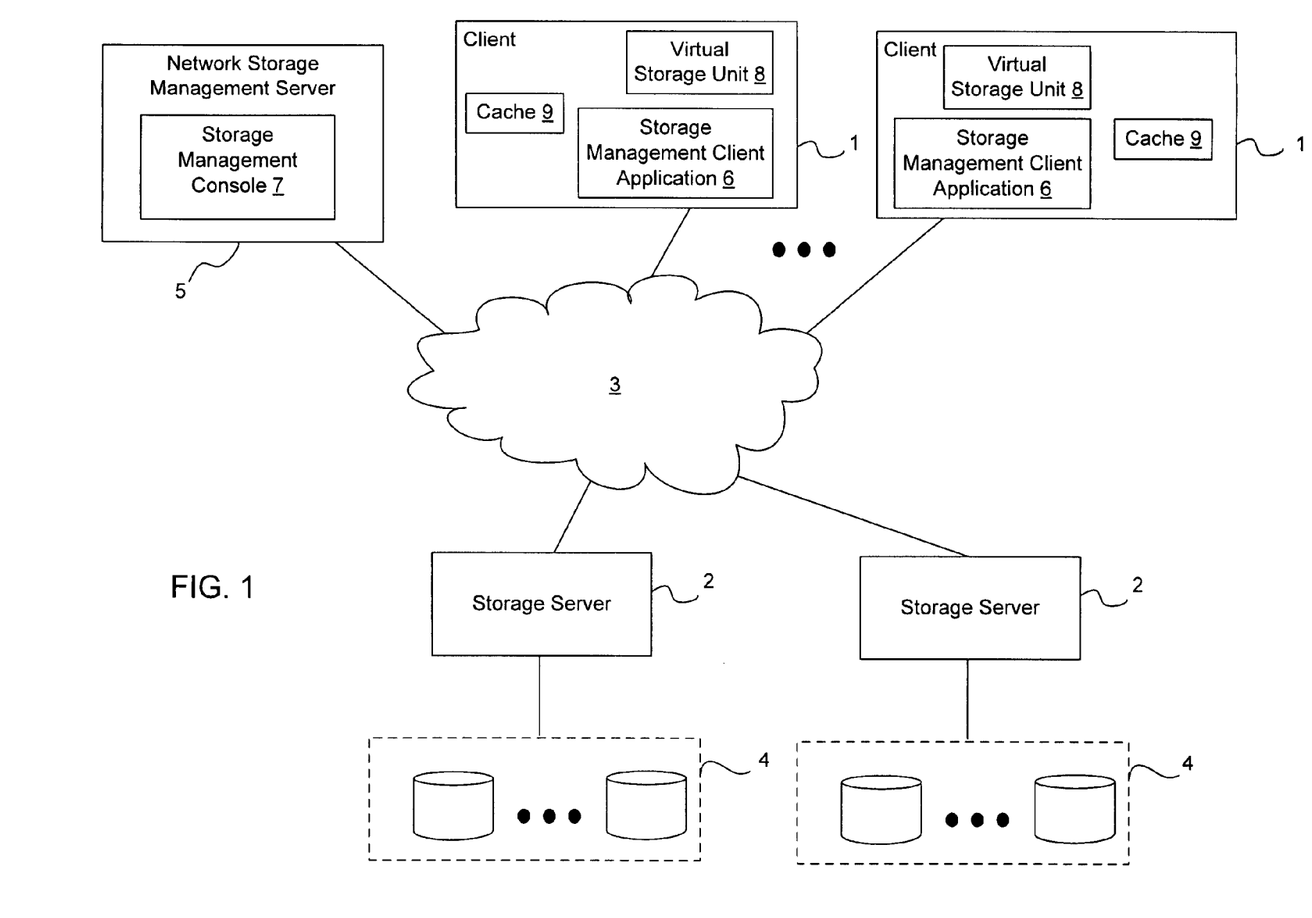
FIG. 1 illustrates a network environment in which the invention can be implemented, according to one embodiment of the present invention.

FIG. 1 illustrates a network environment in which the invention can be implemented. In FIG. 1, a number of storage servers 2 are each coupled locally to a separate storage subsystem 4, each of which includes multiple mass storage devices. The storage servers 2 are also coupled through an interconnect 3 to a number of clients 1. Each storage subsystem 4 is managed by its corresponding storage server 2.

Figure 9:
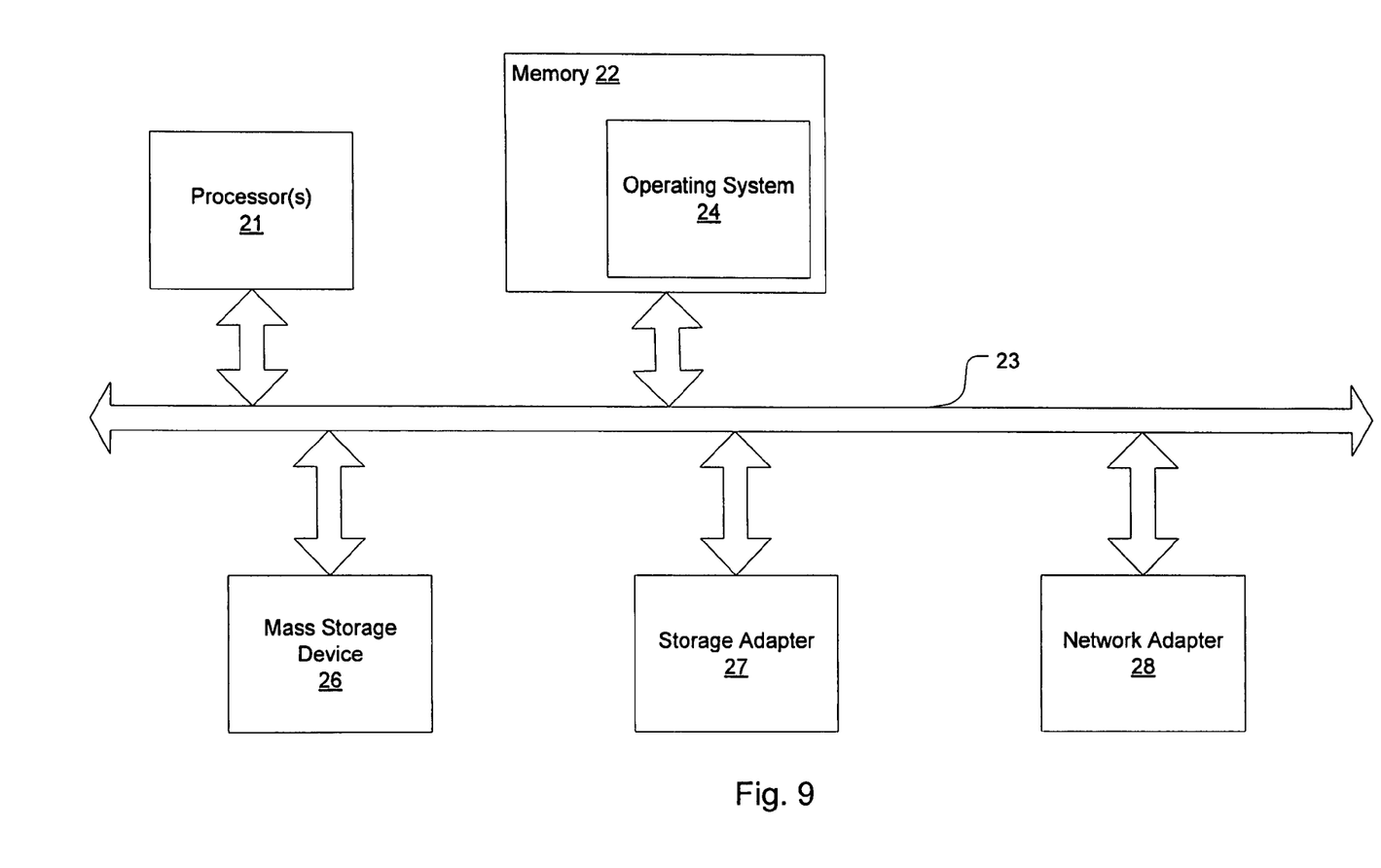
FIG. 9 is a high-level block diagram showing an example of the hardware architecture of a computer system.

Each of the clients 1 can be a computer system such as the one shown in FIG. 9. Such a computer system includes a processor, a memory, adapters, etc. In one embodiment, each of the clients 1 may send read or write requests directed to data stored in or to be stored in the corresponding storage subsystem 4.

Each of the clients 1 may execute a storage management client application 6. In one embodiment, the storage management client application 6 submits a storage management command from client 1 to a storage server 2. The storage management command may be, for example, a command to create a PPI of a volume on the storage server 2. The command may be initiated at the client 1, or may be initiated by a user who is remotely connected to the client 1.

In one embodiment, client 1 maintains a virtual storage unit 8. As used herein, a storage unit refers to a volume, a file system, or a directory, etc. Although data contained and organized by a virtual storage unit 8 is not stored on the client 1 that hosts the virtual storage unit 8, the virtual storage unit 8 appears to a user or software process of the client 1 as if the data of the virtual storage unit 8 was stored on the client 1. The storage management application 6 maintains configuration information of the virtual storage unit 8. Such configuration information includes the mapping between the virtual storage unit 8 and the storage object of a storage server 2 which stores the data for the virtual storage unit 8. For example, the virtual storage unit 8 may be a file system by the name /mnt/oracle. Configuration information may include: name of the device local to client 1, on which /mnt/oracle is mounted (e.g., /dev/sdc); name of the LUN (e.g., /vol/oraclvol/oracle_lun) which resides on a storage server and which is mapped to /dev/sdc; name of the volume (e.g., /vol/oracle) on which the In one embodiment, a user may submit a request to access data of the virtual storage unit 8 (such as a request to read a file) or a request to modify the virtual storage unit 8 (such as a request to create a directory). In response to the request, the storage management client application 6 determines the storage object and the storage server 2 which maintains the data of the virtual storage unit 8. A person of ordinary skill in the art would understand that the request may also be initiated by a software process, such as a pre-scheduled storage management task (not shown in FIG. 1). After the storage object and the storage server 2 are determined, the storage management client application 6 converts the request into a storage server specific command or an Application Programming Interface (API) call. According to an embodiment of the present invention, before the storage management client application 6 submits the command or an API call to the storage server 2, the storage management client application 6 checks whether it has metadata regarding the storage object of the storage server 2 cached locally, for example, in cache 9 of the client 1. If storage management client application 6 does not have the metadata, the storage management client application 6 requests such metadata from the NSMS 5. Then, the storage management client application 6 receives the metadata from the NSMS 5 and stores it in cache 9 of the client 1. Before the storage management client application 6 submits the command or API call to the storage server 2, the storage management client application 6 determines, based on the locally cached metadata in cache 9, whether the operation to be accomplished by the command or API call violates data and/or structural integrity of the storage server's storage system. If the violation is detected, the storage management client application 6 aborts the operation and reports an error. Otherwise, the command or API call is submitted to the storage server 2. This advantageously avoids submitting multiple commands to storage server 2. In one embodiment, cache 9 is a cache memory or a part of a main memory (such as memory 22 shown in FIG. 9). A person of ordinary skill in the art would understand that cache 9 may also be implemented in a mass storage device (such as mass storage 26 shown in FIG. 9).

Still referring to FIG. 1, Network Storage Management Server (NSMS) 5 is also connected to the interconnect 3. The NSMS 5 is a computer system, such as the computer system shown in FIG. 9. The NSMS 5 has a processor, a memory, adapters, etc. According to one embodiment of the present invention, the NSMS 5 is initialized to maintain a copy of a set of metadata describing a storage structure of each of the storage servers 2. In response to any change of the storage structure of each of the storage servers 2, the NSMS 5 updates the copy of the set of metadata after receiving periodic updates from the storage servers 2, as will be described in more detail herein. Further, the NSMS 5 identifies storage management client application(s) 6 whose locally cached metadata needs to be updated. Then, the NSMS 5 sends a relevant portion of the set of metadata to the identified storage management client application(s) 6 to update the metadata cached at the corresponding storage management client application 6.

The NSMS 5 also executes a storage management console 7. The storage management console 7 is an application configured to provide an interface allowing a user (such as an administrator of a virtual storage unit 8) or a software process to control a storage management client application 6. Such an interface may be either a user interface (a Graphical User Interface, for example) or an API.

The NSMS 5 and each of the clients 1 may be, for example, a conventional personal computer (PC), server class computer, workstation, or the like. Each of the clients 1 may execute an operating system such as Windows®, UNIX®, etc.

Storage server 2 may be, for example, a file server used in a NAS environment (a "filer"), a block-based storage server such as used in a storage area network (SAN), or other type of storage server. In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol, such as, for example, RAID-4, RAID-5, RAID-DP, or any other RAID protocol.

Storage servers may have distributed architectures, to facilitate clustering of storage nodes. Clustering facilitates scaling of performance and storage capacity. For example, rather than being implemented in a single box, any one or more of the storage servers 2 may include a separate N—("network") module and D—(disk) module, which are contained within separate housings and communicate with each other via some type of switching fabric or other communication medium. An N-module is an element that acts as a front-end of a storage server, exporting a file service abstraction to clients. A D-module manages the underlying storage. Each D-module typically manages a separate set of disks. Storage servers which implement the Data ONTAP® GX operating system from NetApp can have this type of distributed architecture.

Figure 2A:
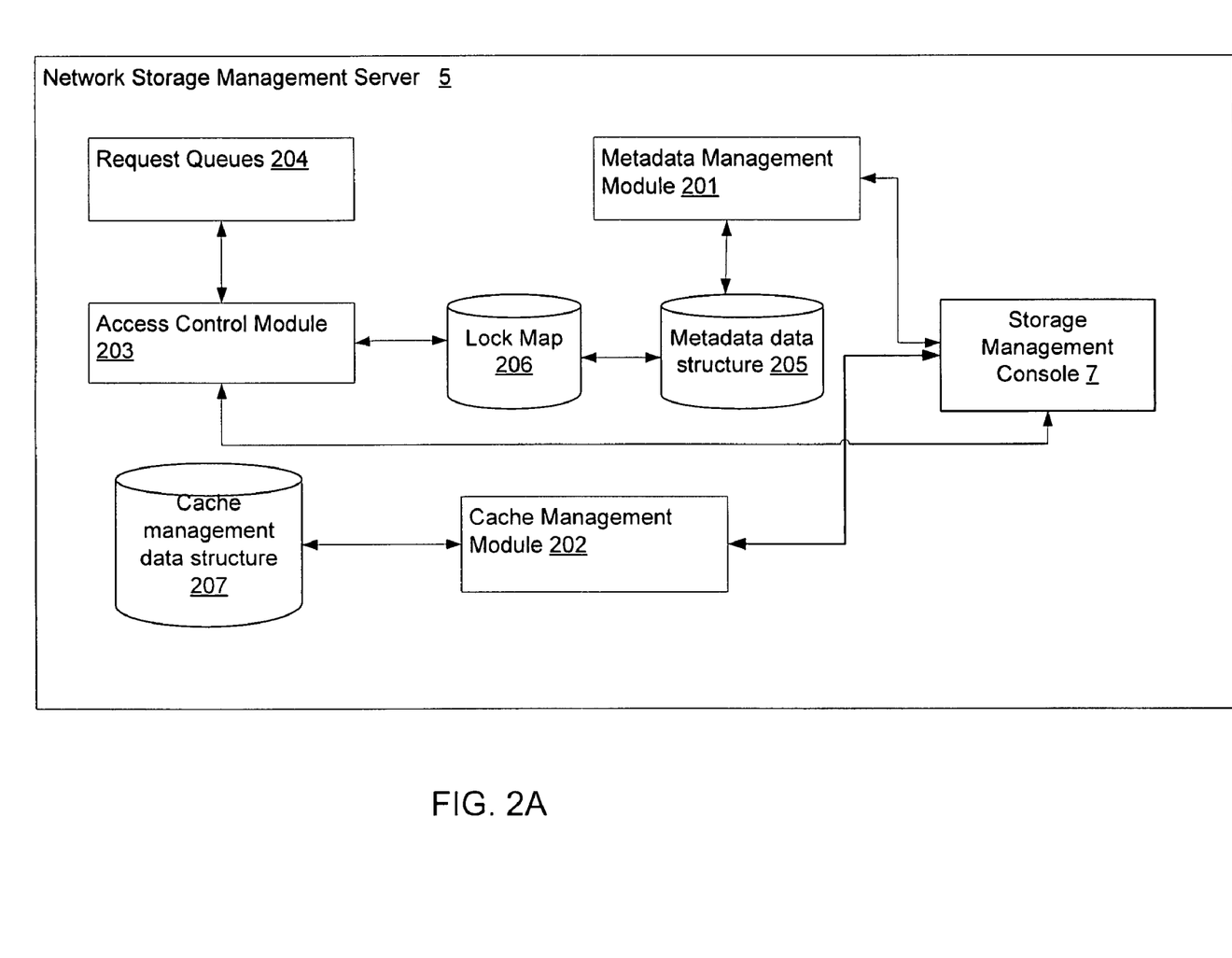
FIG. 2A illustrates an example of architecture of a Network Storage Management Server shown in FIG. 1, according to one embodiment of the present invention.

FIG. 2A illustrates an example of architecture of the Network Storage Management Server 5 (shown in FIG. 1) according to an embodiment of the present invention. As shown in FIG. 2A, the NSMS 5 includes a metadata management module 201, a cache management module 202, an access control module 203, request queues 204, data structures, such as metadata data structure 205, a lock map 206, and cache management data structure 207. The NSMS 5 also executes a storage management console 7 as illustrated in FIG. 1.

Metadata data structure 205 stores a copy of a set of metadata describing a storage structure of each of the storage servers 2. In an embodiment of the present invention, metadata describing a storage structure of a storage server 2 includes data identifying storage objects maintained by the storage server and relationships among these storage objects. Examples of storage object include a volume, a Logical Unit Number (LUN), and a Persistent Point-in-time Image (PPI), although other objects can be used. An example of a relationship between two storage objects is a parent-child relationship, in which one storage object contains the other storage object. A change of a storage structure of a storage server may include an addition of a storage object as a result of the creation of the storage object, a removal of an existing storage object, or a change of one of the attributes of an existing storage object. Examples of an attribute of a storage object include a name of the storage object, free storage space available on the storage object, etc.

The metadata management module 201 manages the set of metadata stored in metadata data structure 205. The metadata management module 201 monitors each of the storage servers 2 to determine whether there is any change in the storage structure. In another embodiment, each storage server 2 can inform the metadata management module 201 of any storage structure change that occurred. In response to any storage structure change, the corresponding storage server 2 sends the changed metadata to the metadata management module 201 to update the copy of the set of metadata stored in metadata data structure 205.

Metadata management module 201 can be implemented as software, firmware, specially designed hardware, or any combination thereof. Metadata data structure 205, may be any data structure that organizes and stores data, such as a database table, a file, etc.

The NSMS 5 also executes a cache management module 202. The cache management module 202 manages a data structure, such as cache management data structure 207. In an embodiment of the present invention, each storage management client application 6 (as shown in FIG. 1) caches a portion of a set of metadata describing the storage structure of a storage server 2.

Cache management data structure 207 organizes and stores data identifying which portion of the set of metadata is cached by each storage management client application 6. In response to a change of the copy of the set of metadata stored in metadata data structure 205, the cache management module 202 determines, based on data stored in cache management data structure 207, the storage management client application(s) 6 whose locally cached metadata needs to be updated. Then, the cache management module 202 sends updated metadata to each of the identified storage management client application(s) 6 to update the metadata cached locally at the corresponding storage management client application 6. Cache management module 202 can be implemented as software, firmware, specially designed hardware, or any combination thereof. The cache management data structure 207, may be any data structure that organizes and stores data, such as a database table, a file, etc.

The NSMS 5 further executes an access control module 203. The access control module 203 controls access to storage objects of each storage server 2. For example, the access control module 203 determines whether an access request directed to a storage object of a storage server 2 should be allowed based on data organized and stored in lock map 206.

Such an access request may be, for example, sent from a storage management client application 6. Lock map 206 maintains lock information for each storage object of a storage server 2. When a storage object is being accessed in response to a request sent from a storage management client application 6, the storage object is locked so that another access request may need to wait until the current request is being processed. In one embodiment, if the access control module 203 determines that a request cannot be allowed at the moment, the access control module 203 puts the request in one of the request queues 204. Access control module 203 can be implemented as software, firmware, specially designed hardware, or any combination thereof.

A user or a software process may initiate a storage management request, from a storage management console 7, to a storage management client application 6. In one embodiment, if the request is directed to a storage object of a storage server 2, the storage management console 7 may determine whether the storage object of the storage server 2 is locked. However, if the request is directed to a virtual storage unit 8 of a client 1, the storage management console 7 forwards the request to the storage management client application 6 on the corresponding client 1. Because the storage management client application 6 has the configuration information of the virtual storage unit 8, it is able to determine the storage object and the storage server 2 which maintains the data of the virtual storage unit 8. The storage management client application 6 then sends the identities of the storage object and the storage server 2 back to the access control module 203. The access control module 203, in turn, determines whether the storage object on the particular storage server 2 is locked. The lock map 206 may be any data structure that organizes and stores data, such as a database table, a file, etc.

A person of ordinary skill in the art would understand that data or part of the data stored in metadata data structure 205, lock map 206 and/or cache management data structure 207 may be resident in a main memory (such as memory 22 shown in FIG. 9) or a cache memory for faster access.

Figure 2B:
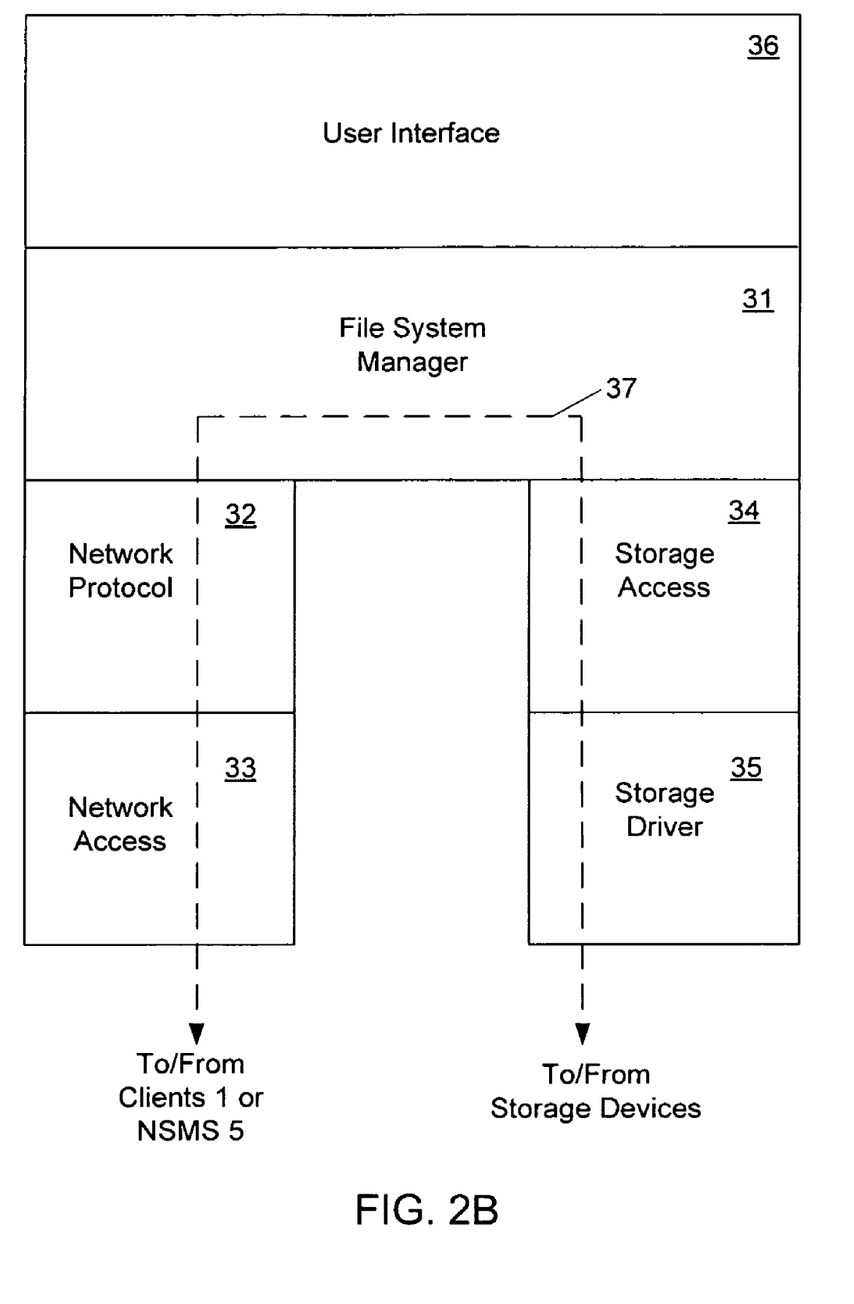
FIG. 2B illustrates an operating system of a storage server 2.

FIG. 2B illustrates an operating system of a storage server 2. As shown, the operating system can include several modules, or layers. These modules or layers include a file system manager 31, a network protocol layer 32, a network access layer 33, a storage access layer 34 and a storage driver layer 35.

The file system manager 31 is an application-level programmatic entity which imposes a structure (e.g. hierarchical) on volumes, files, directories and/or other data containers stored and/or managed by a storage server 2, which services read/write requests from clients 1 of the storage server 2. In one embodiment, the file system manager 31 organizes and manages metadata describing a storage structure of the storage server 2. In response to a storage structure change, the file system manager 31 sends updated metadata to the NSMS 5. Alternatively, the NSMS 5 may periodically send a request or an API call to the file system manager 31 to request updated metadata. An example of a file system manager employed by the present invention is WAFL® file system that is part of the Data ONTAP® storage operating system, both provided by Network Appliance, Sunnyvale, Calif. A person of ordinary skill in the art would understand that other file systems can be used in accordance with the inventive principles described herein.

Logically, under the file system manager 31, the operating system also includes a network protocol layer 32 and an associated network access layer 33, to allow the storage server 2 to communicate over a network (e.g., with clients 1). The network protocol layer 32 implements various protocols, such as NFS, CIFS, HTTP, SNMP, and TCP/IP. The network access layer 33 includes one or more drivers, which implement one or more protocols to communicate over the interconnect 3, such as the Ethernet or Fibre Channel. Also logically under the file system manager 31, the operating system includes a storage access layer 34 and an associated storage driver layer 35, to allow the storage server 2 to communicate with the storage subsystem 4. The storage access layer 34 implements a storage redundancy protocol, such as, for example, RAID-4 or RAID-5. It should be understood that other types and levels of RAID implementations may be used in accordance with the inventive principles described herein. The storage driver layer 35 implements a lower-level storage device access protocol, such as Fibre Channel or SCSI. Reference numeral 37 in FIG. 3 shows the data access path through the operating system, associated with servicing read and write requests from clients 1.

Figure 3:
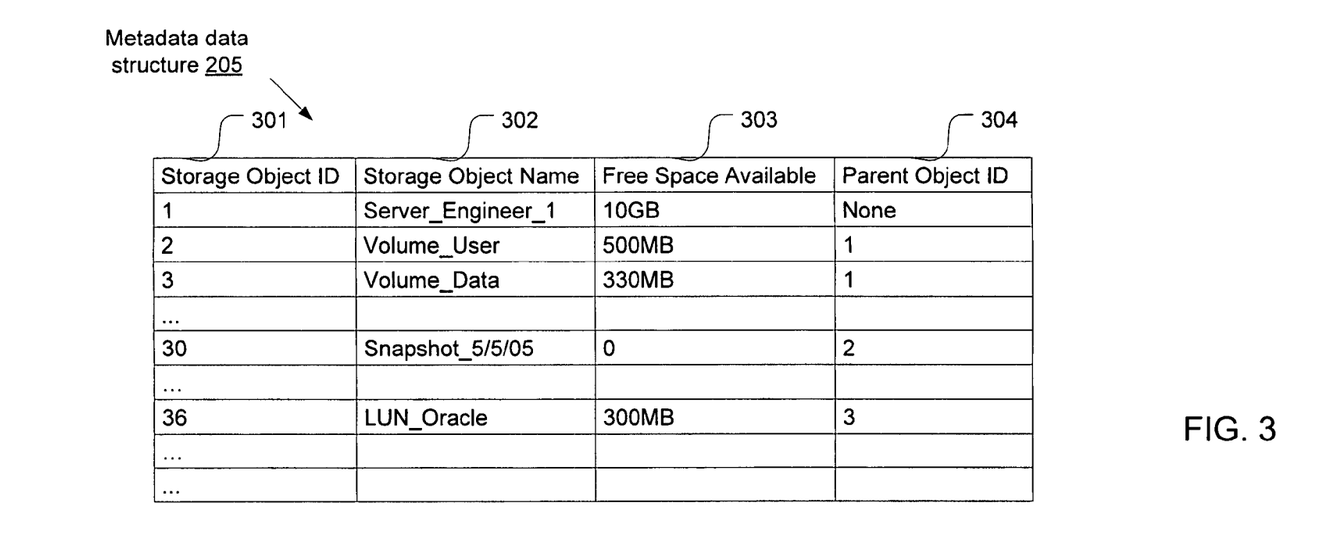
FIG. 3 illustrates an example of a metadata data structure shown in FIG. 2A, according to one embodiment of the present invention.

FIG. 3 illustrates an example of an embodiment of metadata data structure 205 shown in FIG. 2. As shown, a set of metadata describing a storage structure of a storage server 2 may be stored in a table. An entry in the table may include a storage object ID field 301, a storage object name field 302, a free space available field 303 and a parent object ID field 304. The storage object ID field 301 stores identification of a storage object. The storage object name field 302 stores a name of the storage object. The free space available field 303 stores the amount of free space currently available on the storage object. The parent object ID field 304 stores a parent object ID.

Figure 4:
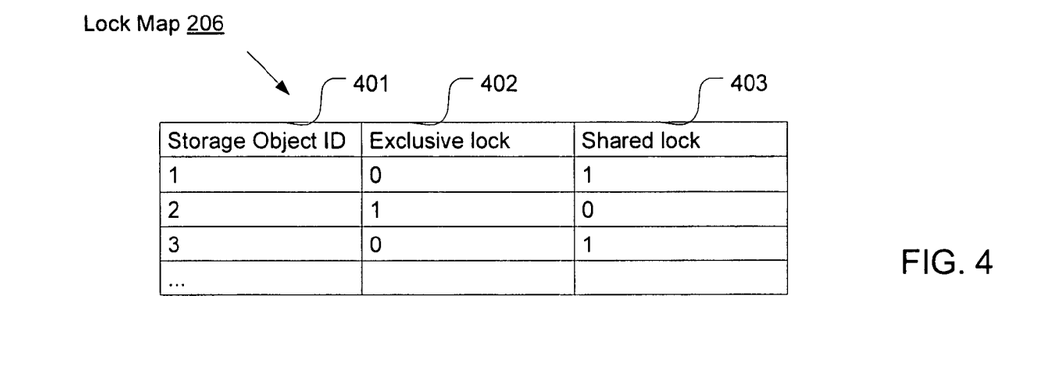
FIG. 4 illustrates an example of a lock map shown in FIG. 2A, according to one embodiment of the present invention.

FIG. 4 illustrates an example of an embodiment of lock map 206 shown in FIG. 2. As shown, an exemplary entry of lock map 206 includes the following fields: a storage object ID field 401, an exclusive lock field 402 and a shared lock field 403. Fields 402 and 403 indicate whether a particular storage object is being accessed in an exclusive mode (i.e., no other access requests can access the storage object) or in a shared mode (i.e., the storage object is allowed to be accessed simultaneously or concurrently by another access request which does not require exclusively lock the same storage object.). In one embodiment, when exclusive lock field 402 is set as "1", it indicates that the storage object is locked exclusively. In one embodiment, when a storage object is being accessed in a shared mode, the corresponding shared field 403 is set as "1" meaning the storage object is currently locked in a shared mode. Of course, the setting of a lock could be represented using other values. A person of ordinary skill in the art would understand that lock map 206 and metadata data structure 205 may be organized and stored in one data structure, such as a database table.

Figure 5:
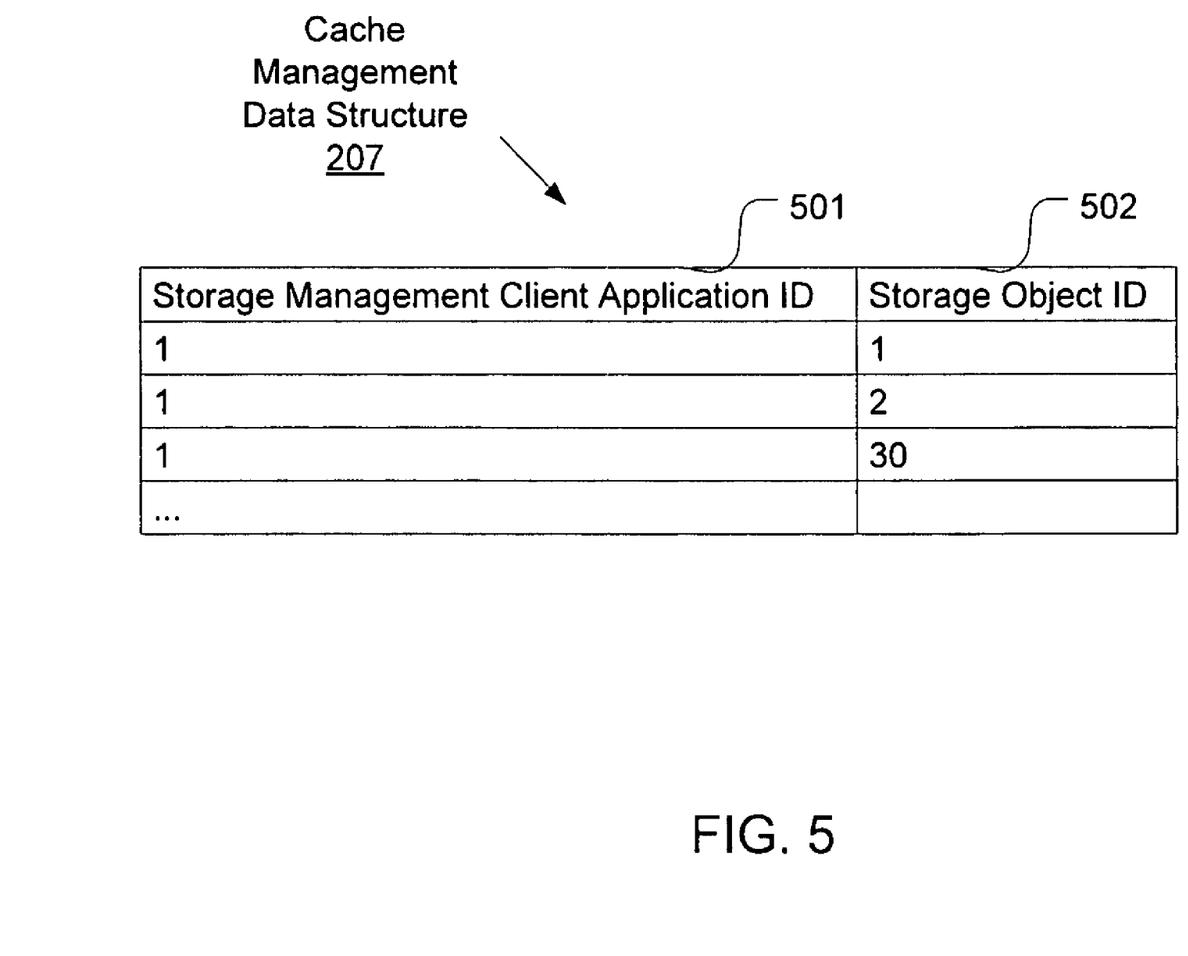
FIG. 5 illustrates an example of an embodiment of cache management data structure shown in FIG. 2A.

FIG. 5 illustrates an example of an embodiment of cache management data structure 207 shown in FIG. 2. As shown, an exemplary entry of cache management data structure 207 may have a storage management client application ID field 501 and a storage object ID field 502. The storage management client application ID field 501 identifies a storage management client application. The storage object ID field 502 identifies a storage object. Each entry in cache management data structure 207 represents that the metadata cached locally at the corresponding storage management client application 6 includes information regarding the corresponding storage object. For example, as shown in FIG. 5, metadata regarding the storage objects identified with IDs 1, 2 and 30 are currently cached by the storage management client application 6 with ID "1".

Figure 6A:
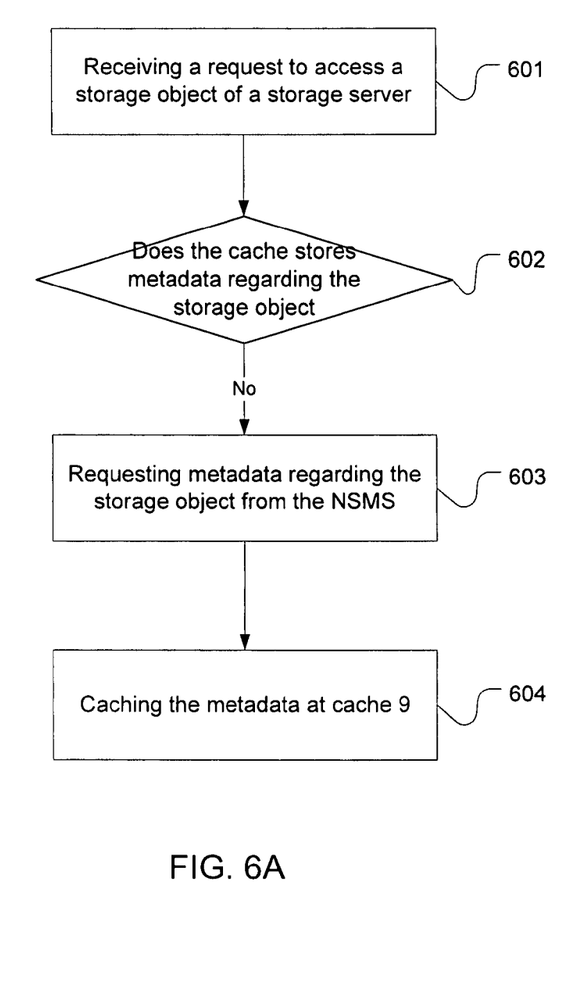
FIG. 6 is a flow diagram illustrating a process of updating metadata cached at a storage management client application, according to one embodiment of the present invention.

FIG. 6A is a flow diagram illustrating a process of caching metadata locally to a storage management client application 6. In one embodiment, the metadata is cached in cache 9 of the client 1, on which the storage management client application 6 is executed. At block 601, the storage management client application 6 receives a request to access a storage object on a storage server 2. The request may be, for example, originated from a user at the storage management console 7 on the NSMS 5.

At block 602, the storage management client application 6 determines whether the local cache 9 stores metadata regarding the storage object. Here, metadata regarding a storage object includes metadata of the parents and children of the storage object. For example, as shown in FIG. 3, metadata regarding a storage object "Volume_Data" includes metadata of the storage object "Volume_Data" as well as metadata of the storage object "Server_Engineer_1" and metadata of the storage object "LUN_Oracle".

If the local cache 9 does not store metadata regarding the storage object, then at block 603, the storage management client application 6 requests metadata regarding the storage object from the NSMS 5. At block 604, the storage management client application 6 then caches in cache 9 metadata received from NSMS 5.

Note that after the NSMS 5 sends the metadata regarding the storage object to the storage management client application 6, NSMS 5 updates the cache management data structure 207 to record those storage objects which metadata is sent to the storage management client application 6 for caching.

Figure 6B:
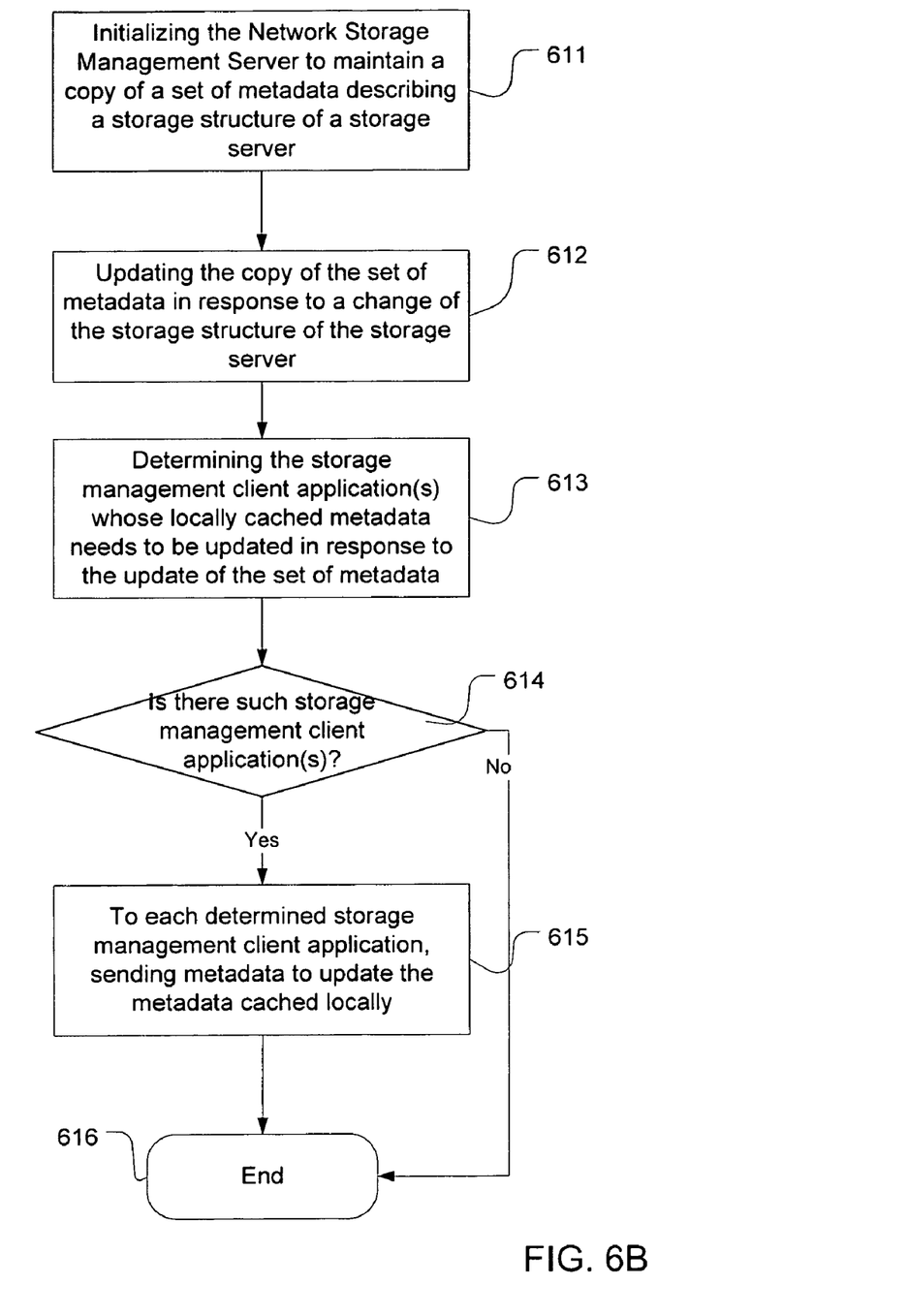

FIG. 6B is a flow diagram illustrating a process of updating metadata cached locally at the storage management client application 6. At block 611, NSMS 5 (shown in FIG. 1) is initialized to store a copy of a set of metadata describing a storage structure of a storage server 2 (shown in FIG. 1). The NSMS 5 may be initialized when a storage server 2 registers with the NSMS 5. The registration may be done manually by a user (e.g., a network administrator) or automatically by a software process running at the storage server (the software process is not shown in FIGS. 1-9). For example, the software process may be a program which automatically detects an NSMS on a network. Upon discovering an NSMS 5, the software process registers the storage server 2 with the NSMS 5. The set of metadata may be, for example, stored in metadata blocks of the storage server 2. In one embodiment, the metadata is organized and managed by the file system manager layer 31 of storage server's operating system. After the registration, the storage server 2 transfers a set of metadata to the NSMS 5. In one embodiment of the present invention, more than one storage server 2 may register with the NSMS 5. Thus, more than one sets of metadata may be maintained and stored at the NSMS 5.

At block 612, the NSMS 5 updates the copy of the set of metadata if the storage structure of the corresponding storage server 2 is changed. Such change may include, for example, an addition of a storage object as a result of the creation of the storage object, a removal of an existing storage object, or a change of one of the attributes of an existing storage object. Attributes of a storage object may include the name of the storage object, free storage space available on the storage object, etc. For example, if a volume is created on a storage server, the newly created volume's storage object ID, name, free space available on the volume, and parent storage object's ID (the storage server's ID) are sent by the storage server 2 to the NSMS 5. A new entry is created in the metadata data structure 205 to reflect the newly created volume. On the other hand, if a volume is deleted, then information regarding the deletion of the volume is sent by the storage server 2 to the NSMS 5. The corresponding entry representing the deleted volume in metadata data structure 205 is removed to reflect the deletion of the volume.

At block 613, the cache management module 202 of the NSMS 5 looks up the cache management data structure 207 to determine the storage management client application(s) 6 whose locally cached metadata needs to be updated as a result of the update of the copy of the set of metadata at the NSMS 5. First, the cache management module 202 determines the ID of the storage object that has been added, removed or otherwise modified during the update. Then, the cache management module 202 looks up the cache management data structure 207 to find the storage management client application ID or IDs that are mapped to the storage object ID.

At block 614, it is determined whether such storage management client application(s) 6 is found. If no such storage management client application 6 is found, the process ends with respect to this particular transaction. Otherwise, if the application 6 is found, at block 615, the cache management module 202 sends information to the corresponding storage management client application(s) 6 to update the locally cached metadata respectively. For example, if a volume is deleted, a message indicating that the volume is deleted is sent to a corresponding storage management client application 6 for updating the locally cached metadata. The process ends at block 616.

Figure 8:
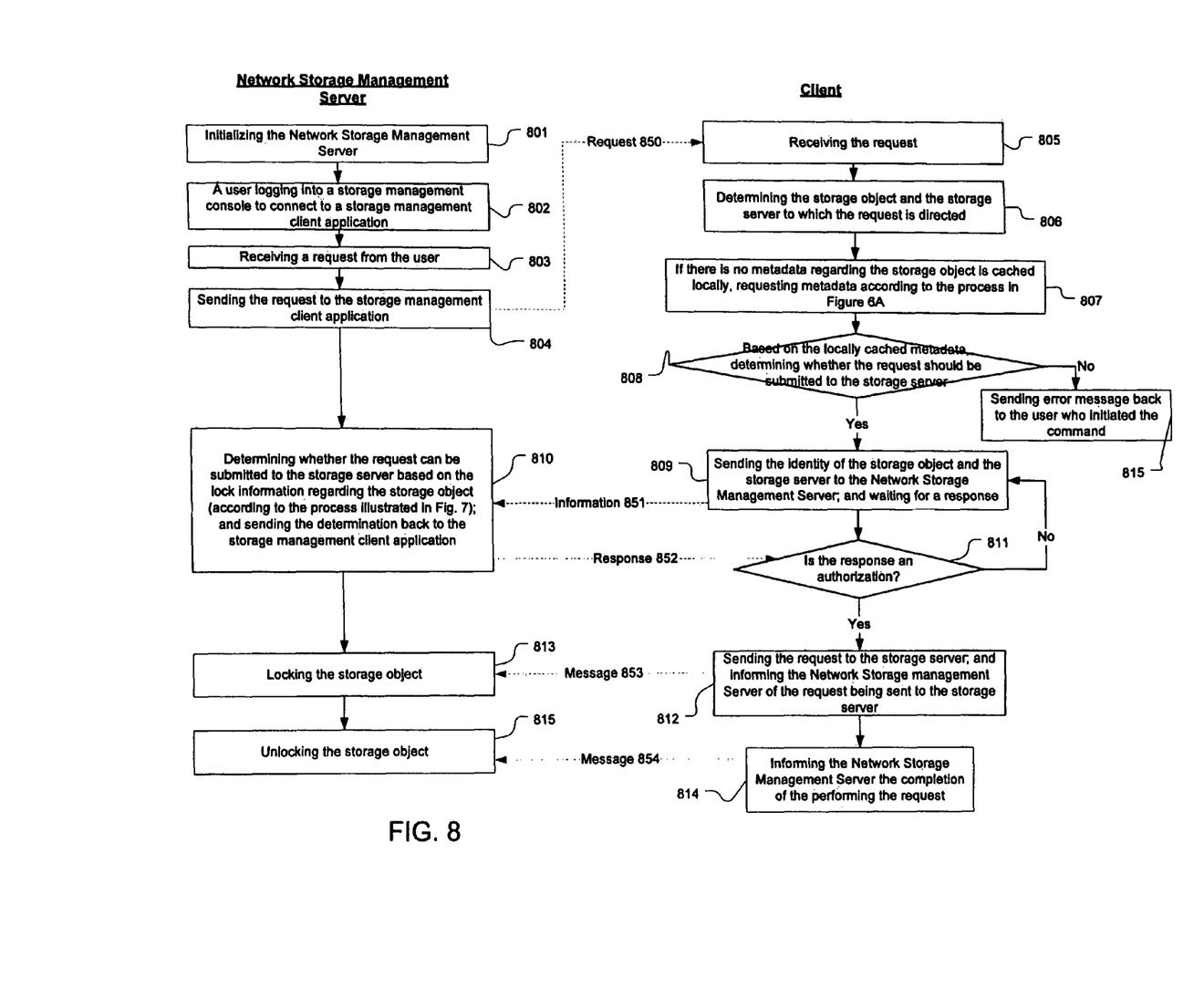
FIG. 8 is a flow diagram illustrating a process of storage management via a storage management console 7 shown in FIG. 1, according to one embodiment of the present invention.

Referring now to FIG. 8, it illustrates an event diagram of the steps performed by NSMS 5 and client 1. At block 801, the NSMS 5 is initialized to maintain a copy of a set of metadata describing the storage structure of a storage server 2. The NSMS 5 may be initialized according to the process illustrated in block 611 of FIG. 6B.

At block 802, a user logs into a storage management console 7, to connect to a storage management client application 6. In one embodiment, as the user logs in, the user specifies which storage management client application 6 the user wants to connect to. Alternatively, the user may log into the storage management console 7 first and then specify the client application 6 he wants to connect to.

At block 803, the storage management console 7 on the NSMS 5 receives a storage management request 850 from the user. The storage management request 850 may be, for example, a command directed to a virtual storage unit 8 maintained on a client 1. The storage management request 850 may also be, for example, a command directly directed to a storage object of a storage server 2.

At block 804, the NSMS 5 sends the request 850 to the storage management client application 6.

At block 805, the storage management client application 6 receives the request 850.

At block 806, the storage management client application 6 determines the storage object and storage server 2 to which the request 850 is directed. For example, the storage management client application 6 may access the configuration information of the virtual storage unit 8 to determine which storage object on which storage server is storing the data of the virtual storage unit 8, At block 807, the storage management client application 6 determines whether metadata regarding the storage object of the storage server 2 is cached locally in cache 9. If not, the storage management client application 6 requests such metadata from the NSMS 5 according to the process described in FIG. 6A.

At block 808, based on the locally cached metadata, the storage management client application 6 determines whether the request 850 should be submitted to the storage server 2. For example, assuming the locally cached metadata indicates that there is already a volume named "user" in the storage server "engineer_a", a request to create a new volume named "user" on the storage server "engineer_a" cannot succeed because of a name conflict. Thus, if the command is submitted to the storage server 2, it will be rejected by the storage server 2, which unnecessarily consumes the network bandwidth and the storage server's processing resources. To avoid the above problem, at block 809, if the command is allowable according to the determination made at block 807, the storage management client application 6 sends, at block 809, information 851 including the identities of the storage object and the storage server 2 to the NSMS 5. Application 6 then awaits for a response. Otherwise, if the command is not allowable, at block 815, the storage management client application 6 sends an error message to inform the user of the failure. Thus, by caching metadata of storage objects at client 1 and at NSMS 5 the present invention advantageously avoids sending unnecessary requests to storage server 2, thereby reducing network latency.

However, if the storage management request 850 is directed to a storage object of a storage server 2, the above process in blocks 804-809 may be omitted because the storage object and the storage server may be determined directly from information stored in the request 850. In this case, the NSMS 5 may determine, based on data stored in metadata data structure 205, whether the request 850 will fail because it violates the data/structure integrity of the storage server 2. At block 810, the access control module 203 determines whether the request 850 can be submitted to the storage server 2 based on data stored in lock map 206.

Figure 7:
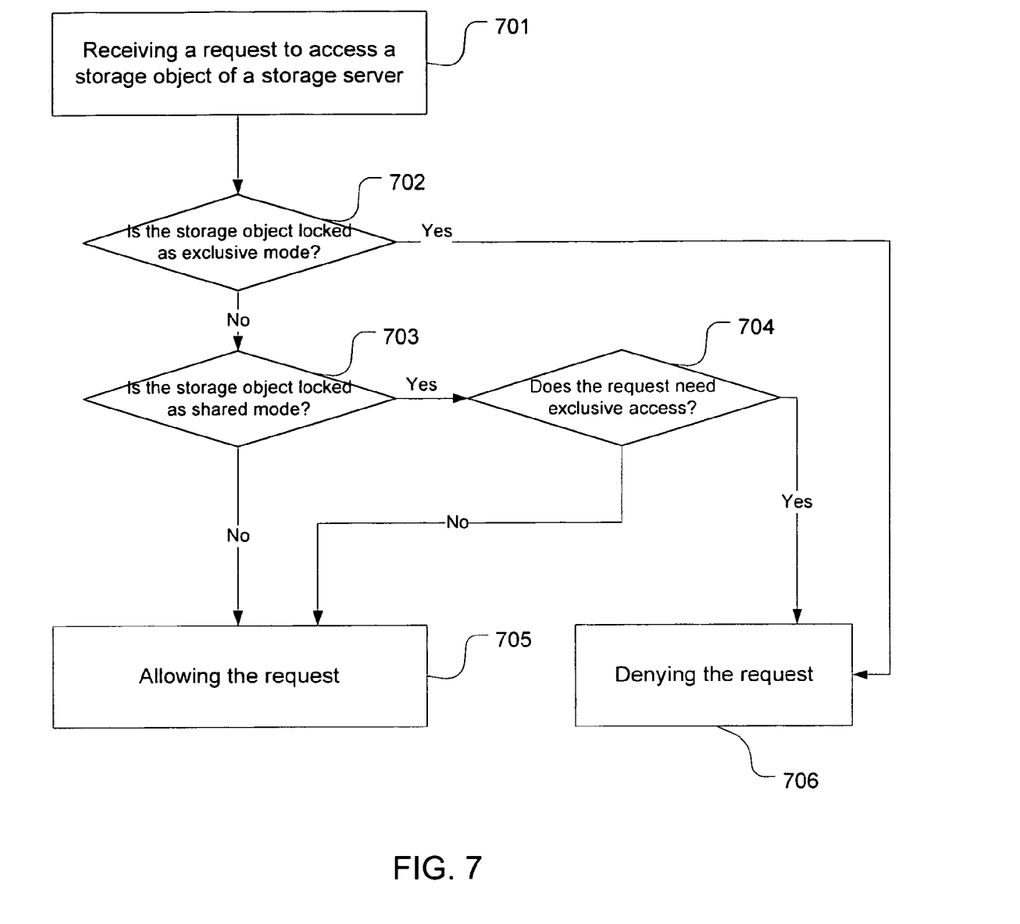
FIG. 7 is a flow diagram illustrating a process of controlling access to a storage object of a storage server 2, according to one embodiment of the present invention.

Referring now to FIG. 7, it illustrates the steps performed by access control module 203 to determine whether the request 850 can be submitted to the storage server. The request may be, for example, to create a PPI for a volume "user" on a storage server "engineer_a".

At block 702, the access control module 203 looks up lock map 206 to determine whether the storage object is locked as "exclusive". If the storage object is locked as "exclusive", the request is denied. If the storage object is not locked as "exclusive", the access control module 203 determines, at block 703, whether the storage object is locked as "shared". If the storage object is locked as "shared", the access control module 203 determines, at block 704, whether the request needs an exclusive access. If the request needs an exclusive access, the request is denied at block 706. If the request does not need exclusive access, the request is allowed at block 705. In one embodiment, if a request is allowed, a message is sent back to inform the storage management console 7 or the storage management client application 6 that it may submit the request to the storage server 2. If a request is denied, a message is sent back to inform the storage management console 7 or the storage management client application 6 that it may not submit the request to the storage server 2 at the moment. The storage management console 7 or the storage management client application 6 may resubmit the request at a later time. Alternatively, if a request is denied, the access control module 203 puts the request in a request queue 204. The access control module 203 then sends a message to inform the corresponding storage management console 7 or the storage management client application 6 that the request is pending and a new message will be sent to it as soon as the request may be allowed. If, however, the storage object is not locked as "shared", as determined at block 703, the request is allowed at block 705.

Referring again to FIG. 8, the access control module 203 then sends a response 852 back to the storage management client application 6. At block 811, the storage management client application 6 receives the response 852 from the NSMS 5. If the message indicates that the request 850 is allowed, the storage management client application 6 submits the request 850, at block 812, to the storage server 2. Also, at block 812, the storage management client application 6 sends a message 853 to inform the NSMS 5 that the request has been sent to the storage server 2.

At block 813, the NSMS 5 receives the confirmation message 853 and locks the storage object. Based on the type of the request, the storage object is locked either as "exclusive" or as "shared". For example, an operation of deleting a PPI requires exclusive access to the PPI. An operation to read the data of the PPI requires shared access.

At block 814, after the request is performed (for example, a volume is created), the storage management client application 6 sends a message 854 to inform the NSMS 5 so that it may unlock any storage object locked for the request.

Otherwise, at block 811, if the response is not an authorization, the process loops back to block 809, where the storage management client application 6 may resend the information and waits for another response.

Thus, embodiments of the present invention first submit requests to NSMS 5 to determine whether a request to server 2 can be submitted. This avoids sending multiple requests to storage server 2.

FIG. 9 is a high-level block diagram showing an example of the components of the client and NSMS 5 shown in FIG. 1.

Certain standard and well-known components which are not germane to the present invention are not shown. The system shown in FIG. 9 includes one or more processors 21 coupled to a bus system 23.

The bus system 23 in FIG. 9 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The processors 21 are the central processing units (CPUs) of the processing system and, thus, control the overall operation of the processing system. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 22 coupled to the bus system 43. The memory 22 represents any form of random access memory (RAM), read-only memory (ROM), flash memory, or a combination thereof. Memory 22 stores, among other things, the operating system 24 of processing system.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the processing system to access a storage subsystem and may be, for example, a Fibre Channel adapter or a SCSI adapter. The network adapter 28 provides the processing system with the ability to communicate with remote devices over a network and may be, for example, an Ethernet adapter or a Fibre Channel adapter. Memory 22 and mass storage device 26 store software instructions and/or data, which may include instructions and/or data used to implement the techniques introduced here.

Thus, a method and apparatus for caching metadata of a storage system have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
receiving, by a client system executing a storage management application, a storage management command from a network storage management server to change a storage structure of a storage server, wherein the command is to be executed by the storage server and the command indicates a storage object of the storage server;
storing locally in the client system metadata describing the storage structure of the storage server, the metadata comprising data that describes the storage object of the storage server;
determining, by the client system, whether execution of the command by the storage server would violate at least one of data integrity of the storage server and structural integrity of the storage server, wherein the determination is made using the locally cached metadata;
responsive to a determination that executing the command by the storage server would violate an integrity of the storage server, sending, by the client system, an error message to the network storage management server; and
responsive to a first determination that executing the command by the storage server would not violate an integrity of the storage server,
sending, by the client system to the network storage management server, an identification of the storage server and the storage object indicated in the command,
receiving, by the client system, a determination from the network storage management server of whether the storage object of the storage server is accessible, and
submitting, by the client system, the command to the storage server, responsive to a determination that the storage object is accessible.

2. The method of claim 1, further comprising:
maintaining a set of metadata describing a storage structure of the storage server at the network storage management server;
automatically updating the set of metadata in the network storage management server in response to a change of the storage structure; and
in response to the set of metadata being automatically updated, sending from the network storage management server at least a portion of the set of metadata to the storage management client application to update metadata cached locally by the client system.

3. The method of claim 2, wherein the set of metadata describing the storage structure of the storage server includes data identifying a first storage object of the storage server, data identifying a second storage object of the storage server, and data describing a relationship between the first and second storage objects.

4. The method of claim 3, wherein the change of the storage structure comprises an addition of a third storage object, a removal of the first storage object, a change of an attribute of the first storage object, or a change of the relationship.

5. The method of claim 4, wherein each of the first, second and third storage objects is a volume, a Logical Unit Number (LUN), or a Persistent Point-in-time Image (PPI) of a dataset.

6. The method of claim 5, wherein an attribute of the first storage object comprises the name of the first storage object.

7. The method of claim 5, wherein an attribute of the first storage object comprises free storage space available on the first storage object.

8. The method of claim 5, wherein the relationship is a parent-child relationship.

9. The method of claim 2 further comprising sending the at least a portion of the set of metadata to the storage management client application to update metadata cached locally at the storage management client application when the metadata cached locally at the storage management client application is inconsistent with the at least a portion of the set of metadata.

10. The method of claim 2 further comprising controlling access to a storage object of the storage server by the network storage management server.

11. The method of claim 10, wherein controlling access to the storage object comprises
receiving, by the network storage management server, a request to access the storage object;
if the storage object is locked as having an exclusive access, denying the request or putting the request in a waiting queue;
if the storage object is locked as having a shared access and the request does not require exclusive access to the storage object, allowing the request;
if the storage object is locked as having a shared access and the request requires exclusive access to the storage object, denying the request or putting the request in a waiting queue; and
if the storage object is not locked, allowing the request.

12. A system comprising:
a client system executing a storage management application, configured to
receive a request storage management command from a network storage management server to access a change a storage structure of a storage server, wherein the command is to be executed by the storage server and the command indicates a storage object of the storage server, to store metadata describing a storage object of a the storage structure of the storage server in a cache, the metadata comprising data that describes the storage object of the storage server, to determine execution of the command by the storage server would violate at least one of data integrity of the storage server and structural integrity of the storage server, to send to the network storage management server an error message in response to a determination that executing the command by the storage server would violate an integrity of the storage server, and to send to the network storage management server an identification of the storage server and the storage object indicated in the command in response to a determination that executing the command by the storage server would not violate an integrity of the storage server; and the network storage management server configured to send metadata information to the client system and to determine whether the storage object is accessible.

13. The system of claim 12, wherein the network storage management server is further configured to:
maintain a set of metadata describing a storage structure of the storage server;
automatically update the set of metadata in response to a change of the storage structure; and
in response to the update of the set of metadata, sending at least a portion of the set of metadata to the client system to update the metadata cached locally at the client system.

14. The processing system of claim 13, wherein the set of metadata describing the storage structure of the storage server includes data identifying a first storage object of the storage server, data identifying a second storage object of the storage server, and data describing a relationship between the first and second storage objects.

15. The processing system of claim 14, wherein the change of the storage structure comprises an addition of a third storage object, a removal of the first storage object, a change of an attribute of the first storage object, or a change of the relationship.

16. The processing system of claim 15, wherein each of the first, second and third storage objects is a volume, a Logical Unit Number (LUN), or a Persistent Point-in-time Image (PPI) of a dataset.

17. The processing system of claim 16, wherein the attribute of the first storage object comprises the name of the first storage object or the free storage space available on the first storage object.

18. The processing system of claim 16, wherein the relationship is a parent-child relationship.

19. The processing system of claim 13 further comprising sending the at least a portion of the set of metadata to the storage management client application to update the metadata cached locally to the storage management client application only when the metadata cached locally to the storage management client application is inconsistent with the at least a portion of the set of metadata.

20. The processing system of claim 12, wherein the network storage management server is further configured to control access to a storage object of the storage server by:
receiving a request to access the storage object;
if the storage object is locked as exclusive access, denying the request or putting the request in a waiting queue;
if the storage object is locked as shared access and the request does not require exclusive access to the storage object, allowing the request;
if the storage object is locked as shared access and the request requires exclusive access to the storage object, denying the request or putting the request in a waiting queue; and
if the storage object is not locked, allowing the request.

21. A machine-readable medium having sequences of instructions stored therein which, when executed by a processor of a processing system, cause the processor to perform a process comprising:
receiving a storage management command from a network storage management server to change a storage structure of a storage server, wherein the command is to be executed by the storage server and the command indicates a storage object of the storage server;
storing locally in a client system metadata describing the storage structure of the storage server, the metadata comprising data that describes the storage object of the storage server;
determining, whether execution of the command by the storage server would violate at least one of data integrity of the storage server and structural integrity of the storage server, wherein the determination is made using the locally cached metadata;
responsive to a determination that executing the command by the storage server would violate an integrity of the storage server, sending, an error message to the network storage management server; and
responsive to a determination that executing the command by the storage server would not violate an integrity of the storage server,
sending, to the network storage management server, an identification of the storage server and the storage object indicated in the command request,
receiving, a determination from the network storage management server of whether the storage object of the storage server is accessible, and
submitting, the command to the storage server, responsive to a determination that the storage object is accessible.

22. The machine-readable medium of claim 21, further comprising:
maintaining at the network storage management server a set of metadata describing the storage structure of the storage server;
automatically updating the set of metadata in response to a change of the storage structure; and
in response to the update of the set of metadata, sending at least a portion of the set of metadata to the storage management client application to update metadata cached locally by the client system.

23. The machine-readable medium of claim 22, wherein the set of metadata describing the storage structure of the storage server includes data identifying a first storage object of the storage server, data identifying a second storage object of the storage server, and data describing a relationship between the first and second storage objects.

24. The machine-readable medium of claim 22, wherein the change of the storage structure comprises an addition of a third storage object, a removal of the first storage object, a change of an attribute of the first storage object, or a change of the relationship.

25. The machine-readable medium of claim 23, wherein each of the first, second and third storage objects is a volume, a Logical Unit Number (LUN), or a Persistent Point-in-time Image (PPI) of a dataset.

26. The machine-readable medium of claim 24, wherein the attribute of the first storage object comprises the name of the first storage object or the free storage space available on the first storage object.

27. The machine-readable medium of claim 22 further comprising sending the at least a portion of the set of metadata to the storage management client application to update metadata cached locally by the client system only when the metadata cached locally to the storage management client application is inconsistent with the at least a portion of the set of metadata.

28. The machine-readable medium of claim 22 further comprising controlling by the network storage management server access to a storage object of the storage server.

29. The machine-readable medium of claim 28, wherein controlling access to the storage object comprises receiving, by the network storage management server, a request to access the storage object;

if the storage object is locked as exclusive access, denying the request or putting the request in a waiting queue;

if the storage object is locked as shared access and the request does not require exclusive access to the storage object, allowing the request;

if the storage object is locked as shared access and the request requires exclusive access to the storage object, denying the request or putting the request in a waiting queue; and if the storage object is not locked, allowing the request.

\* \* \* \* \*